United States Patent
Landwehr et al.

(10) Patent No.: US 9,938,198 B2
(45) Date of Patent: Apr. 10, 2018

(54) METHOD FOR INTEGRAL JOINING INFILTRATED CERAMIC MATRIX COMPOSITES

(71) Applicants: Rolls-Royce Corporation, Indianapolis, IN (US); Rolls-Royce North American Technologies, Inc., Indianapolis, IN (US); Rolls-Royce High Temperature Composites, Inc., Huntington Beach, CA (US)

(72) Inventors: Sean E. Landwehr, Avon, IN (US); Daniel K. Vetters, Indianapolis, IN (US); Ted J. Freeman, Danville, IN (US); Robert J. Shinavski, Mission Viejo, CA (US)

(73) Assignees: Rolls-Royce Corporation, Indianapolis, IN (US); Rolls-Royce North American Technologies Inc., Indianapolis, IN (US); Rolls-Royce High Temperature Composites Inc., Cypress, CA (US)

( * ) Notice: Subject to any disclaimer, the term of this patent is extended or adjusted under 35 U.S.C. 154(b) by 0 days.

(21) Appl. No.: 15/188,159

(22) Filed: Jun. 21, 2016

(65) Prior Publication Data

US 2016/0368827 A1 Dec. 22, 2016

Related U.S. Application Data (60) Provisional application No. 62/182,882, filed on Jun. 22, 2015.

(51) Int. Cl.
  *C04B 35/78* (2006.01)
  *C04B 35/80* (2006.01)
  (Continued)

(52) U.S. Cl.
  CPC ............ *C04B 35/806* (2013.01); *B32B 18/00* (2013.01); *C04B 35/565* (2013.01);
  (Continued)

(58) Field of Classification Search
  CPC . C04B 35/78; C04B 35/806; Y10T 29/49895; Y10T 428/192
  See application file for complete search history.

(56) References Cited

U.S. PATENT DOCUMENTS 3,923,314 A  12/1975  Lawler et al.
5,296,311 A  3/1994  McMurtry et al.
(Continued)

FOREIGN PATENT DOCUMENTS

EP  1367037 A2  12/2003
EP  2540965 A2  1/2013
(Continued)

OTHER PUBLICATIONS

Extended European Search Report, European Application No. 16172531.2-1371, dated Oct. 21, 2016, 9 pages.
(Continued)

*Primary Examiner* — Alexander Thomas
(74) *Attorney, Agent, or Firm* — Barnes & Thornburg LLP (57) ABSTRACT

Integrated ceramic matrix composite components for use in gas turbine engines are disclosed along with methods for making the same. The methods include coinfiltrating a greenbody assembly with ceramic matrix to produce an integrated component.

19 Claims, 8 Drawing Sheets

(51) Int. Cl.
*B32B 18/00* (2006.01)
*C04B 35/573* (2006.01)
*C04B 37/00* (2006.01)
*F23R 3/00* (2006.01)
*C04B 35/565* (2006.01)
*C04B 41/87* (2006.01)

(52) U.S. Cl.
CPC .......... *C04B 35/573* (2013.01); *C04B 37/001* (2013.01); *C04B 41/87* (2013.01); *F23R 3/002* (2013.01); *F23R 3/007* (2013.01); *C04B 2235/3826* (2013.01); *C04B 2235/422* (2013.01); *C04B 2235/5244* (2013.01); *C04B 2235/612* (2013.01); *C04B 2235/614* (2013.01); *C04B 2235/616* (2013.01); *C04B 2235/77* (2013.01); *C04B 2237/365* (2013.01); *C04B 2237/38* (2013.01); *C04B 2237/60* (2013.01); *C04B 2237/61* (2013.01); *C04B 2237/84* (2013.01); *F05D 2240/11* (2013.01); *F05D 2240/15* (2013.01); *F05D 2300/20* (2013.01); *F05D 2300/6033* (2013.01); *F23M 2900/05004* (2013.01)

(56) References Cited

U.S. PATENT DOCUMENTS

| | | | |
|---|---|---|---|
| 5,310,434 A | 5/1994 | Vives et al. |
| 5,400,947 A | 3/1995 | Wang et al. |
| 5,447,683 A | 9/1995 | Montgomery et al. |
| 5,980,669 A | 11/1999 | Maumus et al. |
| 6,280,550 B1 | 8/2001 | Steibel et al. |
| 6,863,759 B2 | 3/2005 | Richmond et al. |
| 7,771,160 B2 | 8/2010 | Shi et al. |
| 8,167,546 B2 | 5/2012 | Shi et al. |
| 8,496,431 B2 | 7/2013 | Habarou et al. |
| 8,511,975 B2 | 8/2013 | Shi et al. |
| 8,568,091 B2 | 10/2013 | McCaffrey |
| 8,590,770 B2 | 11/2013 | Chaumat et al. |
| 8,684,689 B2 | 4/2014 | Guo et al. |
| 8,801,372 B2 | 8/2014 | Shi et al. |
| 8,834,106 B2 | 9/2014 | Luczak |
| 2009/0110549 A1 | 4/2009 | Snook et al. |
| 2012/0055609 A1 | 3/2012 | Blanchard et al. |
| 2012/0156029 A1 | 6/2012 | Karafillis et al. |
| 2012/0301269 A1 | 11/2012 | Alvanos et al. |
| 2013/0004326 A1 | 1/2013 | McCaffrey |
| 2013/0011248 A1 | 1/2013 | Croteau et al. |
| 2014/0030076 A1 | 1/2014 | Nunez et al. |
| 2014/0202168 A1 | 7/2014 | Shapiro et al. |
| 2014/0272274 A1 | 9/2014 | Lazur |
| 2016/0319682 A1 | 11/2016 | Sippel et al. |

FOREIGN PATENT DOCUMENTS

| | | |
|---|---|---|
| FR | 2980235 B1 | 4/2015 |
| GB | 2481481 A | 12/2011 |
| WO | 2014149094 A1 | 9/2014 |

OTHER PUBLICATIONS

Gregory S. Gorman et al., DOE-CE-41000-3, Melt Infiltrated Ceramic Composites (Hipercomp®) For Gas Turbine Engine Applications, Jan. 2006, 507 pages.

METHOD FOR INTEGRAL JOINING INFILTRATED CERAMIC MATRIX COMPOSITES

CROSS REFERENCE TO RELATED APPLICATIONS

This application claims priority to and the benefit of U.S. Provisional Patent Application No. 62/182,882, filed 22 Jun. 2015, the disclosure of which is now expressly incorporated herein by reference.

FIELD OF THE DISCLOSURE

The present disclosure relates generally to ceramic matrix composite component manufacture, and more specifically to joining of ceramic matrix composite components.

BACKGROUND

Reinforced ceramic matrix composites can be well suited for structural applications because of their potential toughness, thermal resistance, high temperature strength and chemical stability. These composites can be produced by the addition of whiskers, fibers, platelets, or other reinforcements to a ceramic matrix.

Joining ceramic matrix composite components to one another can present challenges. In some joined ceramic matrix composite component assemblies, metallic braze joints couple separate ceramic matrix composite components to provide an integrated assembly. These metallic braze joints can degrade the mechanical integrity of the ceramic matrix composite components. In addition, these metallic braze joints can reduce the temperature capability of the ceramic matrix components due to suppression of a silicon melting point within the ceramic matrix composite components.

SUMMARY

The present disclosure may comprise one or more of the following features and combinations thereof.

A method of making an integrated ceramic matrix composite component for use in a gas turbine engine is disclosed in this paper. The method may include manufacturing a first green body subpart formed to include a first slot, manufacturing a second green body subpart formed to include a second slot, inserting a green body biscuit into the first slot of the first green body subpart and the second slot of the second green body subpart to create a green assembly with a joint between the first green body subpart and the second green body subpart, and slurry infiltrating the green assembly with ceramic-containing matrix to integrally join the green assembly and produce an integrated ceramic matrix composite component.

In some embodiments, the method may include vapor infiltrating the first green body subpart, the second green body subpart, and the green body biscuit with ceramic-containing matrix to at least partially rigidify the first green body subpart, the second green body subpart, and the green body biscuit. The step of vapor infiltrating may be performed before the step of inserting the green body biscuit into the first slot of the first green body subpart and the second slot of the second green body subpart to create a green assembly.

In some embodiments, manufacturing the first green body subpart may include laying up a plurality of reinforcement sheets. The method may include chemical vapor infiltrating the first green body subpart with ceramic-containing matrix to at least partially rigidify the first green body subpart after laying up the plurality of reinforcement sheets. At least some of the plurality of reinforcement sheets may be formed to include cutouts that cooperate to define the first slot before the step of vapor infiltrating the first green body subpart with ceramic-containing matrix.

In some embodiments, the method may include machining at least some of the plurality of reinforcement sheets to define the first slot. This machining may take place after the step of chemical vapor infiltrating the first green body subpart with ceramic-containing matrix.

In some embodiments, each of the plurality of reinforcement sheets included in the first green body subpart may comprise a ceramic-containing fiber. The ceramic-containing fiber may comprise silicon-carbide and the ceramic-containing matrix comprises silicon-carbide.

In some embodiments, the method may include melt infiltrating the first green body subpart, the second green body subpart, and the green body biscuit with ceramic-containing matrix to integrally join the green assembly. The step of melt infiltrating may be performed after the step of slurry infiltrating the green assembly with ceramic-containing matrix.

According to another aspect of the present disclosure, a method of making an integrated ceramic matrix composite component for use in a gas turbine engine is taught. The method may include the steps of chemical vapor infiltrating a first green body subpart, a second green body subpart, and a green body biscuit to at least partially rigidify the first green body subpart, the second green body subpart, and the green body biscuit, inserting the green body biscuit into a first slot formed in the first green body subpart and a second slot formed in the second green body subpart, and slurry infiltrating the first green body subpart, the second green body subpart, and the green body biscuit to produce an integrated ceramic matrix composite component.

In some embodiments, the step of slurry infiltrating the first green body subpart, the second green body subpart, and the green body biscuit may be performed after inserting the green body biscuit into the first slot formed in the first green body subpart and the second slot formed in the second green body subpart. The step of chemical vapor infiltrating may be performed before the step of inserting the green body biscuit into the first slot of the first green body subpart and the second slot of the second green body subpart.

In some embodiments, the first green body subpart may include a plurality of reinforcement sheets adapted to be suspended in ceramic-containing matrix. At least some of the plurality of reinforcement sheets may be formed to include cutouts that cooperate to define the first slot before the step of vapor infiltrating the first green body subpart with ceramic-containing matrix.

In some embodiments, the method may include machining at least some of the plurality of reinforcement sheets to define the first slot after the step of chemically infiltrating the first green body subpart with ceramic-containing matrix.

In some embodiments, each of the plurality of reinforcement sheets included in the first green body subpart may comprise a ceramic-containing fiber.

In some embodiments, the method may include melt infiltrating the first green body subpart, the second green body subpart, and the green body biscuit with ceramic-containing matrix.

According to yet another aspect of the present disclosure, an integrated ceramic-matrix composite component for use in a gas turbine engine is taught. The component may include a first subpart formed to include a first blind slot, a second subpart formed to include a second blind slot, and a biscuit that extends into the first blind slot and the second blind slot to form a joint between the first subpart and the second subpart, wherein the joint is coinfiltrated with ceramic-containing matrix material to integrally join the first subpart, the second subpart, and the biscuit.

These and other features of the present disclosure will become more apparent from the following description of the illustrative embodiments.

DETAILED DESCRIPTION

For the purposes of promoting an understanding of the principles of the disclosure, reference will now be made to a number of illustrative embodiments illustrated in the drawings and specific language will be used to describe the same.

Figure 1:
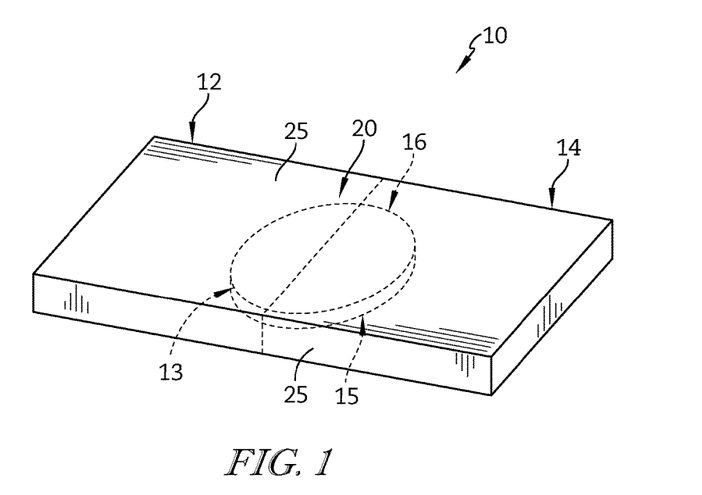
FIG. 1 is a perspective view of an integrally-joined ceramic matrix composite component showing that the component includes a first ceramic matrix composite subpart, a second ceramic matrix composite subpart, and a single round disk-shaped biscuit that is received in slots formed in the first and the second subparts to form a joint between the first and the second subparts.

An integrally joined component 10 adapted for use in a gas turbine engine is shown in FIG. 1. The component 10 illustratively comprises ceramic matrix composite materials and is made up of a first subpart 14, a second subpart 14, and a biscuit 16. The biscuit 16 extends into a first blind slot 13 formed in the first subpart 12 and into a second blind slot 15 formed in the second subpart 14 to form a joint 20. The joint 20 is coinfiltrated with ceramic-containing matrix material to integrally join the first subpart 12, the second subpart 14, and the biscuit 16.

Figure 3:
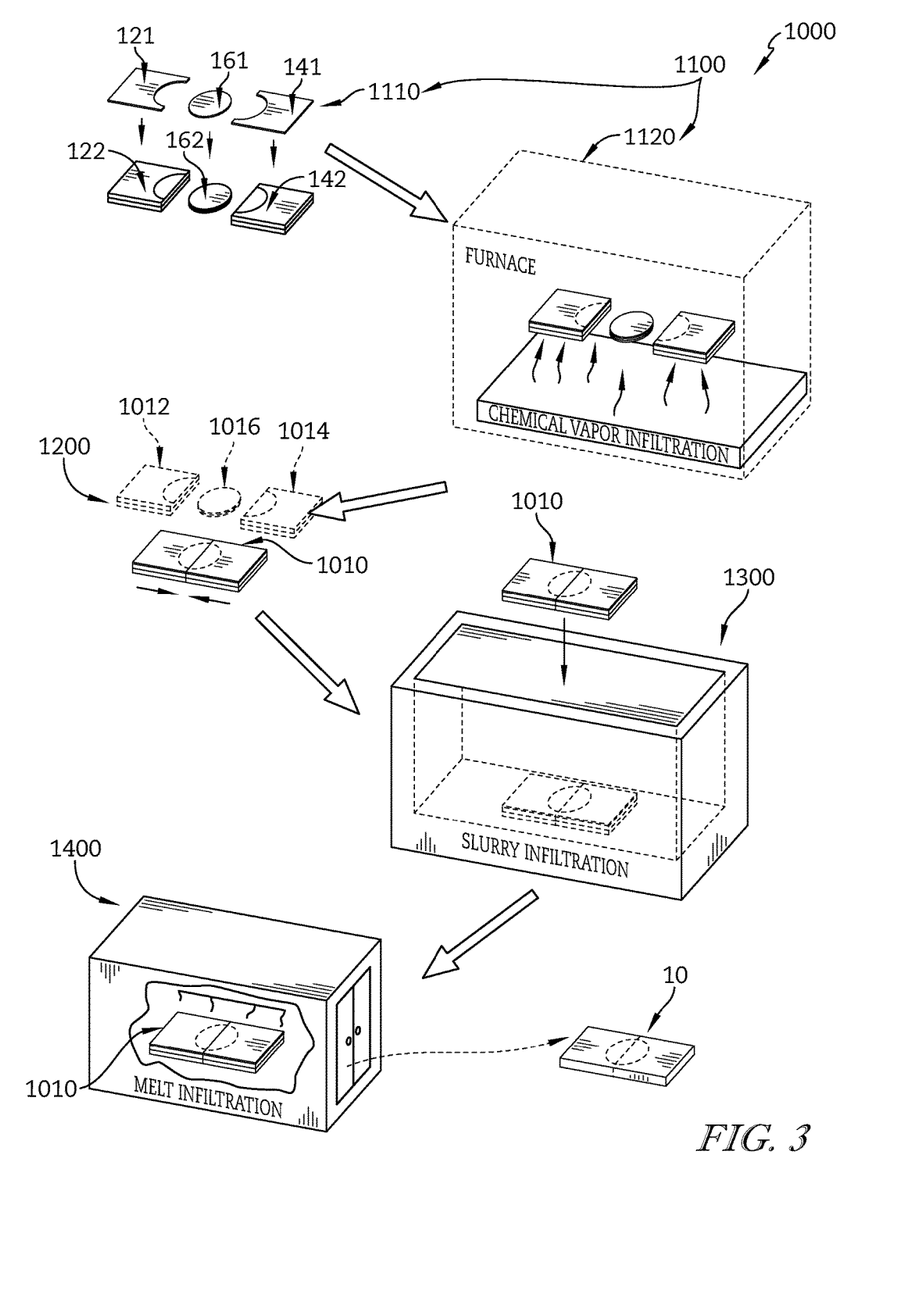
FIG. 3 is a perspective view of a first method for making the integrally-joined ceramic matrix composite component of FIG. 1.

The first subpart 12, the second subpart 14, and the biscuit 16 are each made up of stacked sheets or plies 121, 122, 141, 142, 161, 162 of reinforcement material that is suspended in a ceramic matrix as shown in FIG. 3. In the illustrative embodiment, fibers of the stacked plies comprise silicon-carbide but may comprise other ceramic-containing materials or other non-ceramic materials. In other embodiments, one or more of the first subpart 12, the second subpart 14, and the biscuit 16 may comprise other configurations of reinforcement fibers suspended in a matrix, monolithic ceramic-containing materials, or other materials adapted for use in a gas turbine engine.

Figure 2:
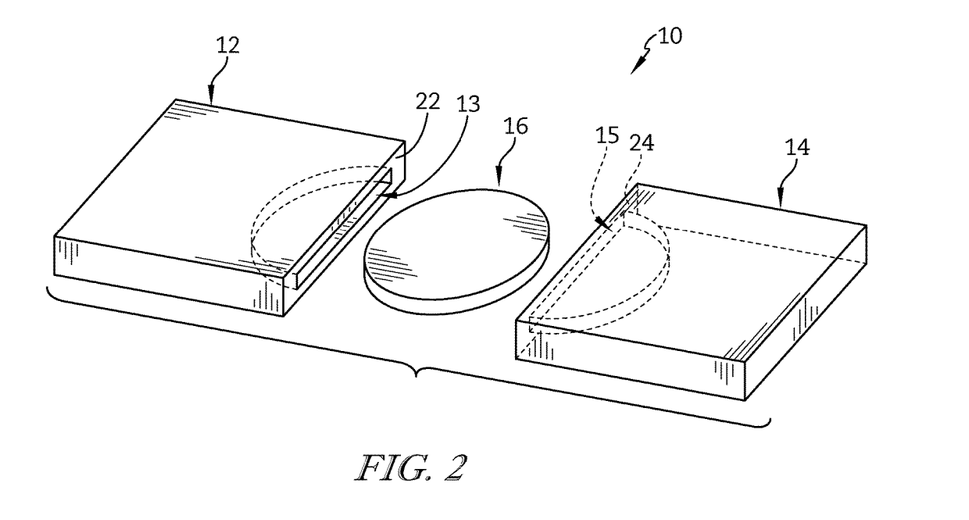
FIG. 2 is an exploded perspective view of the integrally-joined ceramic matrix composite component showing slots formed in the first ceramic matrix composite subpart and the second ceramic matrix composite subpart sized to receive the single round disk-shaped biscuit.

In the illustrative embodiment, the biscuit 16 is a round, disk-shaped component as shown in FIG. 2. The first and the second blind slots 13, 15 are shaped to receive substantially all of the biscuit 16 so that end faces 22, 24 of the first subpart 12 and the second subpart 14 face and engage one another in the illustrative component 10. The biscuit 16 is spaced apart from an outer surface 25 of the component 10.

For example, the integrally joined component 10 or similar components may be used in a gas turbine engine to provide a turbine blade track, in a combustion liner, a heat shield or the like. The integrally joined component 10 may be adapted for use in very high temperature environments and may be used in various applications requiring high temperature service.

Figure 4:
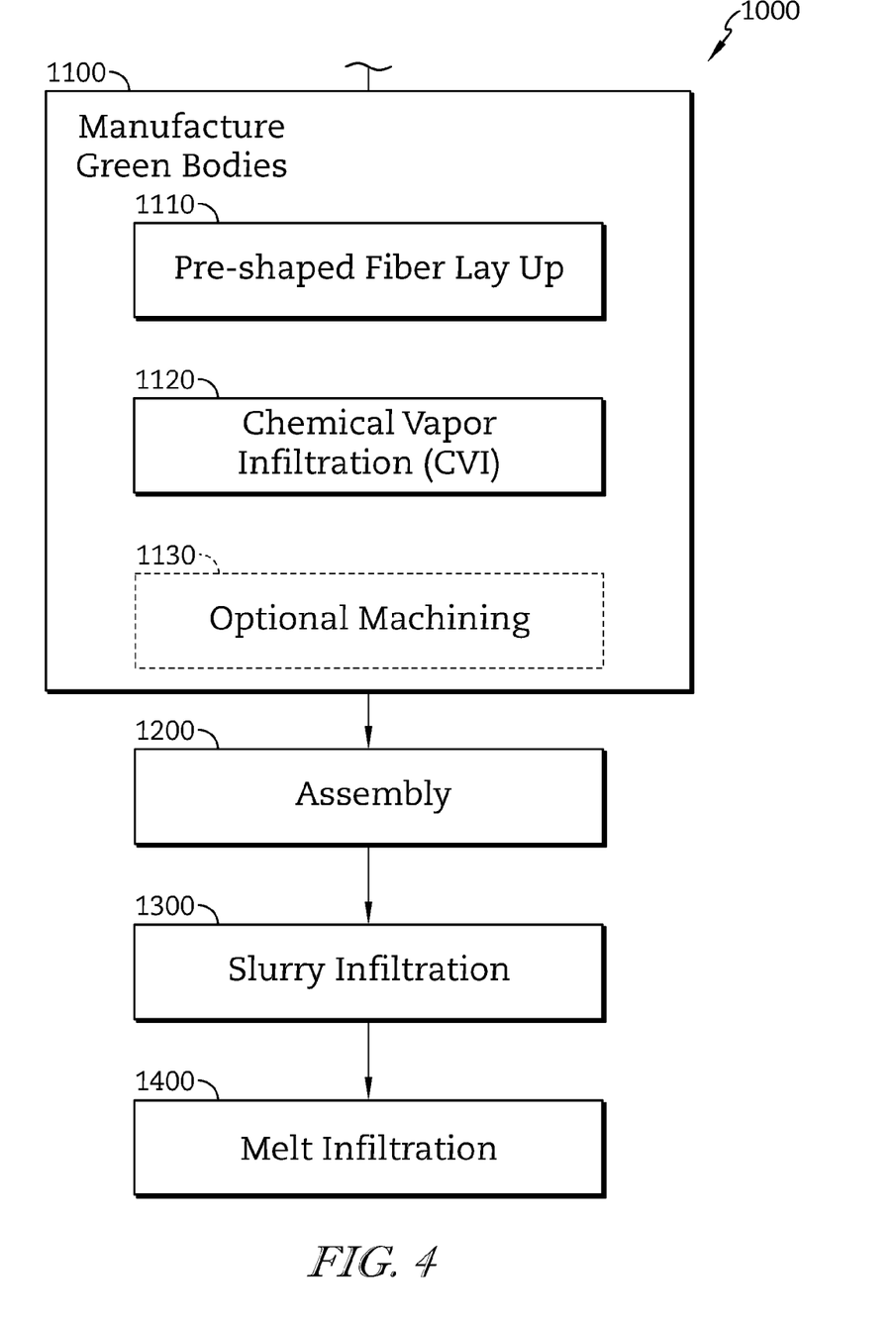
FIG. 4 is a diagrammatic view of the first method shown in FIG. 3 for making the integrally-joined ceramic matrix composite component of FIG. 1.

A first method 1000 of making the integrally joined ceramic matrix composite component 10 is shown in illustratively in FIG. 3 and diagrammatically in FIG. 4. A step 1100 of the method 1000 is manufacturing green bodies to be coinfiltrated. Particularly, in step 1100, a first green body subpart 1012 formed to include a first slot 1013, a second green body subpart 1014 formed to include a second slot 1015, and a green body biscuit 1016 are manufactured.

The step 1100 of manufacturing green bodies includes laying up preshaped reinforcement sheets 121, 122, 141, 142, 161, 162 in a step 1110. The step 1100 of manufacturing green bodies also includes at least partially rididifying the laid up reinforcement sheets 121, 122, 141, 142, 161, 162 via chemical vapor deposition (CVD) in a step 1120 as shown in FIGS. 3 and 4. In some embodiments, rigidizing the reinforcement sheets 121, 122, 141, 142, 161, 162 in the step 1120 may alternatively or additionally include chemical vapor infiltration (CVI). Additionally, in some embodiments, the step 1100 may include an optional machining of the rigidized reinforcement sheets 121, 122, 141, 142, 161, 162 to provide green bodies in a specific shape in a step 1130 as shown in FIG. 4.

At least some of the plurality of reinforcement sheets 121, 122, 141, 142 that are used to make up the green body subparts 1012, 1014 are preshaped or formed to include cutouts 125, 145 that cooperate to define slots in the green body subparts 1012, 1014 as shown in FIG. 3. The plurality of reinforcement sheets 161, 162 are preshaped to provide a round shape of the green body biscuit 1016 when rigidized.

During rigidization of the laid up reinforcement sheets 121, 122, 141, 142, 161, 162 in the step 1120, CVD or CVI may be used to build up one or more layers of matrix on the ceramic fibers included in the laid up reinforcement sheets 121, 122, 141, 142, 161, 162. The one or more layers may include a silicon carbide layer. Furthermore, an intermediate layers such as boron nitride may be deposited prior to the silicon carbide layer. CVD may follow the same thermodynamics and chemistry. CVI and CVD may be non-line of sight processes such that CVI and CVD may occur completely within a furnace as shown in FIG. 3.

The starting material for CVI may include a gaseous precursor that undergoes a chemical reaction to yield a solid and may be performed at temperatures between about 900° C. and about 1300° C. CVI may be performed at relatively low pressure and may use multiple cycles in the furnace. Silicon carbide may also be deposited to build up one or more layers on the fibers while the preform is in the reactor. The silicon carbide may provide additional protection to the fibers and may also increase the stiffness of the laid up reinforcement sheets 121, 122, 141, 142, 161, 162 and the tip preform. In some embodiments, boron nitride may be deposited prior the silicon carbide to provide further beneficial mechanical properties to the fibers.

The laid up reinforcement sheets 121, 122, 141, 142, 161, 162 may be taken out of the furnace after a first pass through the reactor and weighed. If the laid up reinforcement sheets 121, 122, 141, 142, 161, 162 are not at a target weight they may go through the reactor for another run, which may occur as many times as necessary in order to achieve the target weight. The target weight may be determined by the final part to be made. CVI or CVD may form a preform with a porosity of between about 40% and about 60%. If the laid up reinforcement sheets 121, 122, 141, 142, 161, 162 are at the target weight the method 1000 may proceed.

A step 1200 of the method 1000 is assembling green bodies to be coinfiltrated as shown in FIGS. 3 and 4. Particularly, in step 1200, the green body biscuit 1016 is inserted into a first slot 1013 of the first green body subpart 1012 and a second slot 1015 of the second green body subpart 1014 to create a green assembly 1010 with a green joint 1020 between the first green body subpart 1012 and the second green body subpart 1014.

In some embodiments, the biscuit 1016 may be fully processed (rigidized) prior to assembly in step 1200. Such fully processed biscuits 1016 may be preferred when machining of the biscuits 1016 ahead of assembly is required.

A step 1300 of the method 1000 is slurry infiltrating the green assembly 1010 as shown in FIGS. 3 and 4. Slurry infiltration in step 1300 may include infiltrating the green assembly 1010 with slurry. Dispersing the slurry throughout the green assembly 1010 may include immersing the preforms in the slurry composition. The slurry may include particles of silicon carbide and optionally carbon. The slurry may flow into the spaces, pores, or openings between the fibers of the green assembly 1010 such that the slurry particles may uniformly impregnate the pores of the green assembly 1010 and reside in the interstices between fibers of the green assembly 1010. The slurry infiltration process may form a resultant matrix for the component with a porosity of between about, or between precisely, 35% and about 50%.

Prior to immersion, the fibers of the green assembly 1010 may optionally be prepared for slurry infiltration by exposing the fibers to a solution including, for example, water, solvents, surfactants and the like to aid impregnation of the fibers. Optionally, a vacuum may be drawn prior to slurry introduction to purge gas from the green assembly 1010 and further enhance impregnation. Slurry infiltration may be conducted at any suitable temperature such as at room temperature (about 20° C. to about 35° C.). The slurry infiltration may be enhanced by application of external pressure after slurry introduction such as at one atmosphere pressure gradient.

A step 1400 of the method 1000 includes melt infiltration of the green assembly 1010 as shown in FIGS. 3 and 4. During melt infiltration a molten metal or alloy may wick between the openings of the green assembly 1010. In various embodiments, the molten metal or alloy may have composition that includes silicon, boron, aluminum, yttrium, titanium, zirconium, oxides thereof, carbides thereof, and mixtures and combinations thereof. In some instances, carbonaceous powder may be added to assist the melt infiltration. The molten metal or alloy may wick into the remaining pores of the preform through capillary pressure. For example, molten silicon metal may wick into the pores and form silicon carbide to create a matrix between the fibers resulting in a relatively dense integrally joined component 10 compared to the green assembly 1010. For example, after the green assembly 1010 has been densified, the integrally joined component 10 may have a porosity of between about 1 percent and about 10 percent by volume.

In one example, a temperature for melt infiltration of silicon may be between about 1400° C. and about 1500° C. The duration of the melt infiltration may be between about 15 minutes and 4 hours. The melt infiltration process may optionally be carried out under vacuum, but in other embodiments melt infiltration may be carried out with an inert gas under atmospheric pressure to limit evaporation losses. The co-infiltration processes described herein may create the integrally joined component 10 in which the first subpart 12, the second subpart 14, and the biscuit 16 are a one-piece, continuous structure.

Figure 5:
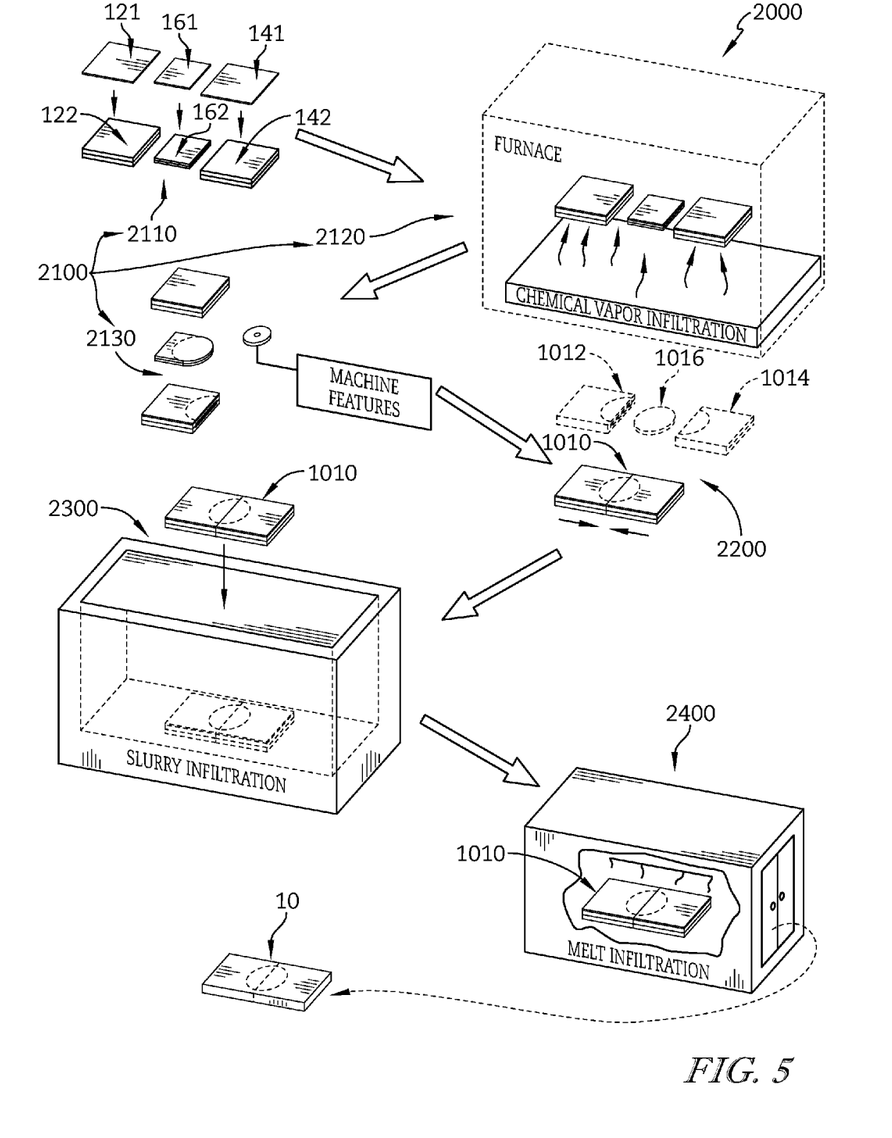
FIG. 5 is a perspective view of a second method for making the integrally-joined ceramic matrix composite component of FIG. 1.
Figure 6:
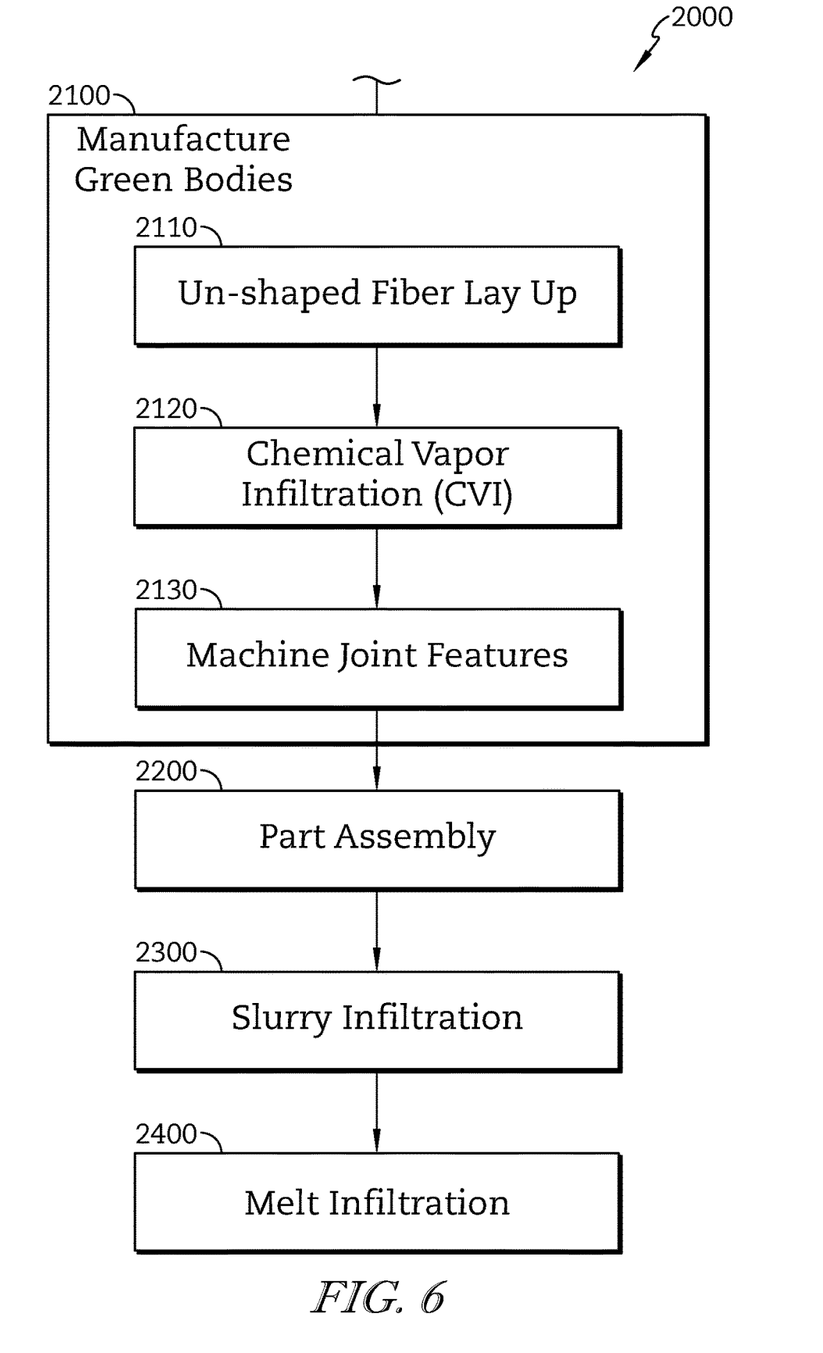
FIG. 6 is a diagrammatic view of the second method shown in FIG. 5 for making the integrally-joined ceramic matrix composite component of FIG. 1.

A second method 2000 of making the integrally joined ceramic matrix composite component 10 is shown in illustratively in FIG. 5 and diagrammatically in FIG. 6. A step 2100 of the method 1000 is manufacturing green bodies to be coinfiltrated. Particularly, in step 2100, a first green body subpart 1012 formed to include a first slot 1013, a second green body subpart 1014 formed to include a second slot 1015, and a green body biscuit 1016 are manufactured.

The step 2100 of manufacturing green bodies includes laying up reinforcement sheets 121, 122, 141, 142, 161, 162 in a step 2110. The step 2100 of manufacturing green bodies also includes at least partially rididifying the laid up reinforcement sheets 121, 122, 141, 142, 161, 162 via chemical vapor deposition (CVD) in a step 2120 as shown in FIGS. 5 and 6. In some embodiments, rigidizing the reinforcement sheets 121, 122, 141, 142, 161, 162 in the step 2120 may alternatively or additionally include chemical vapor infiltration (CVI). Additionally, the step 2100 includes machining of the rigidized laid up reinforcement sheets 121, 122, 141, 142, 161, 162 to provide green bodies in a specific shape in a step 1130 as shown in FIG. 5.

During rigidization of the laid up reinforcement sheets 121, 122, 141, 142, 161, 162 in the step 2120, CVD or CVI may be used to build up one or more layers of matrix on the ceramic fibers included in the laid up reinforcement sheets 121, 122, 141, 142, 161, 162. The one or more layers may include a silicon carbide layer. Furthermore, an intermediate layers such as boron nitride may be deposited prior to the silicon carbide layer. CVD may follow the same thermodynamics and chemistry. CVI and CVD may be non-line of sight processes such that CVI and CVD may occur completely within a furnace as shown in FIG. 5.

The starting material for CVI may include a gaseous precursor that undergoes a chemical reaction to yield a solid and may be performed at temperatures between about 900° C. and about 1300° C. CVI may be performed at relatively low pressure and may use multiple cycles in the furnace. Silicon carbide may also be deposited to build up one or more layers on the fibers while the preform is in the furnace. The silicon carbide may provide additional protection to the fibers and may also increase the stiffness of the laid up reinforcement sheets 121, 122, 141, 142, 161, 162 and the tip preform. In some embodiments, boron nitride may be deposited prior the silicon carbide to provide further beneficial mechanical properties to the fibers.

The laid up reinforcement sheets 121, 122, 141, 142, 161, 162 may be taken out of the furnace after a first pass through the furnace and weighed. If the laid up reinforcement sheets 121, 122, 141, 142, 161, 162 are not at a target weight they may go through the furnace for another run, which may occur as many times as necessary in order to achieve the target weight. The target weight may be determined by the final part to be made. CVI or CVD may form a preform with a porosity of between about 40% and about 60%. If the laid up reinforcement sheets 121, 122, 141, 142, 161, 162 are at the target weight the method 2000 may proceed.

Upon rigidization, the laid up reinforcement sheets 121, 122, 141, 142 are machined in step 2130 to form green body slots 1013, 1015 in the green body subparts 1012, 1014 as shown in FIG. 5. Additionally, when rigidized, the laid up reinforcement sheets 161, 162 are machined in step 2130 to provide a round shape that characterizes the green body biscuit 1016.

A step 2200 of the method 2000 is assembling green bodies to be coinfiltrated as shown in FIGS. 5 and 6. Particularly, in step 2200, the green body biscuit 1016 is inserted into a first slot 1013 of the first green body subpart 1012 and a second slot 1015 of the second green body subpart 1014 to create a green assembly 1010 with a green joint 1020 between the first green body subpart 1012 and the second green body subpart 1014.

In some embodiments, the biscuit 1016 may be fully processed (rigidized) prior to assembly in step 2200. Such fully processed biscuits 1016 may be preferred when machining of the biscuits 1016 ahead of assembly is required.

A step 2300 of the method 2000 is slurry infiltrating the green assembly 1010 as shown in FIGS. 5 and 6. Slurry infiltration in step 2300 may include infiltrating the green assembly 1010 with slurry. Dispersing the slurry throughout the green assembly 1010 may include immersing the preforms in the slurry composition. The slurry may include particles of carbon and optionally silicon carbide. The slurry may flow into the spaces, pores, or openings between the fibers of the green assembly 1010 such that the slurry particles may uniformly impregnate the pores of the green assembly 1010 and reside in the interstices between fibers of the green assembly 1010. The slurry infiltration process may form a resultant matrix for the component with a porosity of between about 35% and about 50%.

Prior to immersion, the fibers of the green assembly 1010 may optionally be prepared for slurry infiltration by exposing the fibers to a solution including, for example, water, solvents, surfactants and the like to aid impregnation of the fibers. Optionally, a vacuum may be drawn prior to slurry introduction to purge gas from the green assembly 1010 and further enhance impregnation. Slurry infiltration may be conducted at any suitable temperature such as at room temperature (about 20° C. to about 35° C.). The slurry infiltration may be enhanced by application of external pressure after slurry introduction such as at one atmosphere pressure gradient.

A step 2400 of the method 2000 includes melt infiltration of the green assembly 1010 as shown in FIGS. 5 and 6. During melt infiltration a molten metal or alloy may wick between the openings of the green assembly 1010. In various embodiments, the molten metal or alloy may have composition that includes silicon, boron, aluminum, yttrium, titanium, zirconium, oxides thereof, and mixtures and combinations thereof. In some instances, graphite powder may be added to assist the melt infiltration. The molten metal or alloy may wick into the remaining pores of the preform through capillary pressure. For example, molten silicon metal may wick into the pores and form silicon carbide to create a matrix between the fibers resulting in a relatively dense integrally joined component 10 compared to the green assembly 1010. For example, after the green assembly 1010 has been densified, the integrally joined component 10 may have a porosity of between about 1 percent and about 10 percent by volume.

In one example, a temperature for melt infiltration of silicon may be between about 1400° C. and about 1500° C. The duration of the melt infiltration may be between about 15 minutes and 4 hours. The melt infiltration process may optionally be carried out under vacuum, but in other embodiments melt infiltration may be carried out with an inert gas under atmospheric pressure to limit evaporation losses. The co-infiltration processes described herein may create the integrally joined component 10 in which the first subpart 12, the second subpart 14, and the biscuit 16 are a one-piece, continuous structure.

Figure 7:
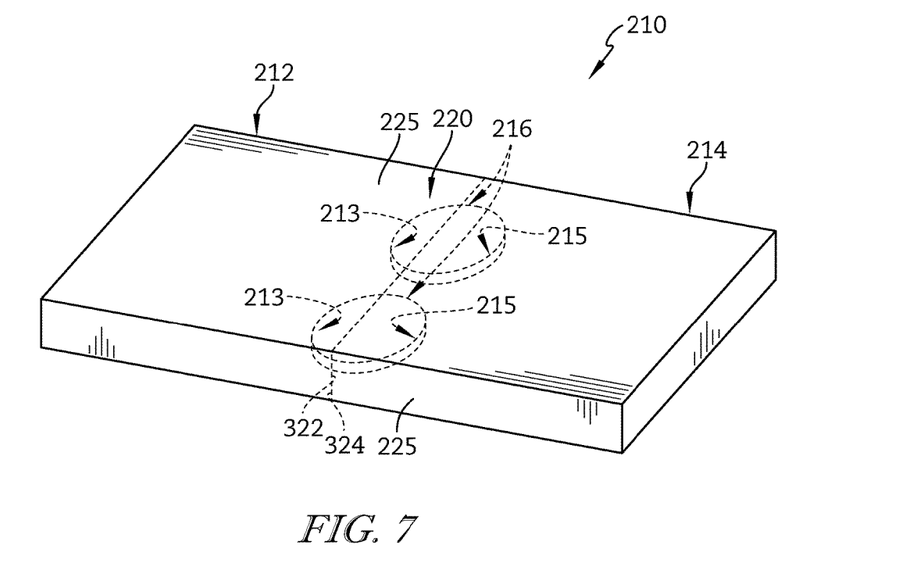
FIG. 7 is a perspective view of a second integrally-joined ceramic matrix composite component adapted to be made by one of the methods shown in FIGS. 3-6 showing that the component includes a first ceramic matrix composite subpart, a second ceramic matrix composite subpart, and a pair of round disk-shaped biscuits.

A second integrally joined component 210 adapted for use in a gas turbine engine that may be made by method 1000 or 2000 is shown in FIG. 7. The component 210 illustratively comprises ceramic matrix composite materials and is made up of a first subpart 214, a second subpart 214, and a pair of biscuits 216. The biscuits 216 extend into blind slots 213 formed in the first subpart 212 and into blind slots 215 formed in the second subpart 214 to form a joint 220. The joint 220 is coinfiltrated with ceramic-containing matrix material to integrally join the first subpart 212, the second subpart 214, and the biscuit 216.

The first subpart 212, the second subpart 214, and the biscuits 216 are each made up of stacked sheets or plies of reinforcement material that are suspended in a ceramic matrix. In the illustrative embodiment, fibers of the stacked plies comprise silicon-carbide but may comprise other ceramic-containing materials or other non-ceramic materials. In other embodiments, one or more of the first subpart 212, the second subpart 214, and the biscuits 216 may comprise other configurations of reinforcement fibers suspended in a matrix, monolithic ceramic-containing materials, or other materials adapted for use in a gas turbine engine.

In the illustrative embodiment, the biscuits 216 are round, disk-shaped components as shown in FIG. 7. The blind slots 213, 215 are shaped to receive substantially all of the biscuits 216 so that end faces 222, 224 of the first subpart 212 and the second subpart 214 face and engage one another in the illustrative component 210. The biscuits 216 are spaced apart from an outer surface 225 of the component 210.

Figure 8:
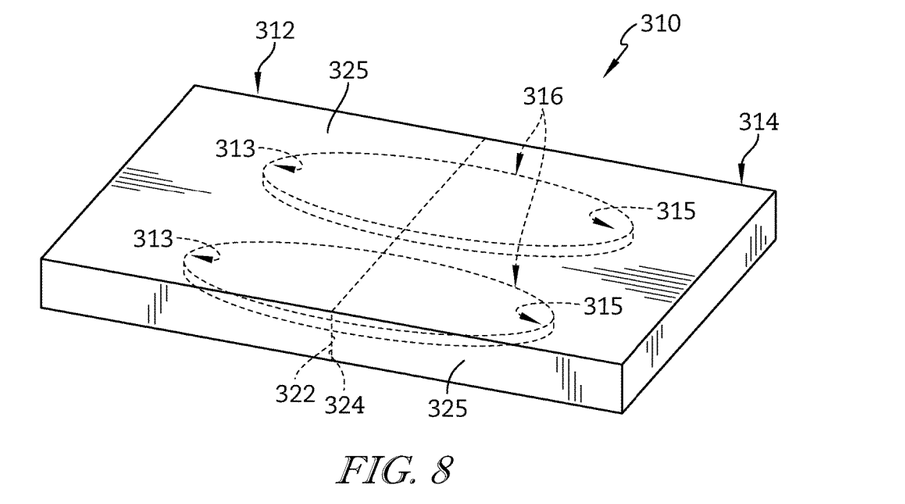
FIG. 8 is a perspective view of a third integrally-joined ceramic matrix composite component adapted to be made by one of the methods shown in FIGS. 3-6 showing that the component includes a first ceramic matrix composite subpart, a second ceramic matrix composite subpart, and a pair of oblong oval-shaped biscuits.

A third integrally joined component 310 adapted for use in a gas turbine engine that may be made by method 1000 or 2000 is shown in FIG. 8. The component 310 illustratively comprises ceramic matrix composite materials and is made up of a first subpart 314, a second subpart 314, and a pair of biscuits 316. The biscuits 316 extend into blind slots 313 formed in the first subpart 312 and into blind slots 315 formed in the second subpart 314 to form a joint 320. The joint 320 is coinfiltrated with ceramic-containing matrix material to integrally join the first subpart 312, the second subpart 314, and the biscuits 316.

The first subpart 312, the second subpart 314, and the biscuits 316 are each made up of stacked sheets or plies of reinforcement material that are suspended in a ceramic matrix. In the illustrative embodiment, fibers of the stacked plies comprise silicon-carbide but may comprise other ceramic-containing materials or other non-ceramic materials. In other embodiments, one or more of the first subpart 312, the second subpart 314, and the biscuits 316 may comprise other configurations of reinforcement fibers suspended in a matrix, monolithic ceramic-containing materials, or other materials adapted for use in a gas turbine engine.

In the illustrative embodiment, the biscuits 316 are oblong, disk-shaped components as shown in FIG. 8. The blind slots 313, 315 are shaped to receive substantially all of the biscuits 316 so that end faces 322, 324 of the first subpart 312 and the second subpart 314 face and engage one another in the illustrative component 310. The biscuits 316 are spaced apart from an outer surface 325 of the component 310.

Figure 9:
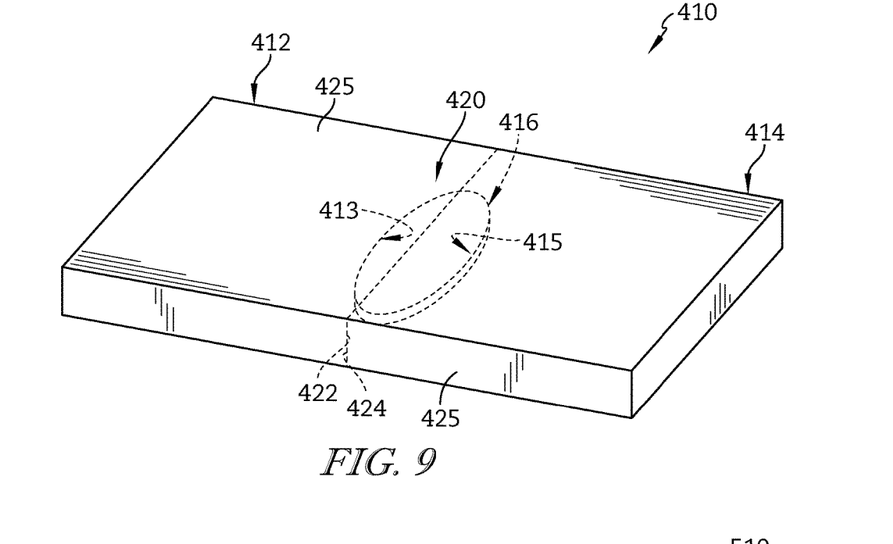
FIG. 9 is a perspective view of a fourth integrally-joined ceramic matrix composite component adapted to be made by one of the methods shown in FIGS. 3-6 showing that the component includes a first ceramic matrix composite subpart, a second ceramic matrix composite subpart, and a single oblong oval-shaped biscuit.

A fourth integrally joined component 410 adapted for use in a gas turbine engine that may be made by method 1000 or 2000 is shown in FIG. 9. The component 410 illustratively comprises ceramic matrix composite materials and is made up of a first subpart 414, a second subpart 414, and a biscuit 416. The biscuit 416 extends into a blind slot 413 formed in the first subpart 412 and into a blind slot 415 formed in the second subpart 414 to form a joint 420. The joint 420 is coinfiltrated with ceramic-containing matrix material to integrally join the first subpart 412, the second subpart 414, and the biscuit 416.

The first subpart 412, the second subpart 414, and the biscuit 416 are each made up of stacked sheets or plies of reinforcement material that are suspended in a ceramic matrix. In the illustrative embodiment, fibers of the stacked plies comprise silicon-carbide but may comprise other ceramic-containing materials or other non-ceramic materials. In other embodiments, one or more of the first subpart 412, the second subpart 414, and the biscuits 416 may comprise other configurations of reinforcement fibers suspended in a matrix, monolithic ceramic-containing materials, or other materials adapted for use in a gas turbine engine.

In the illustrative embodiment, the biscuit 416 is an oblong, disk-shaped component as shown in FIG. 9. The blind slots 413, 415 are shaped to receive substantially all of the biscuit 416 so that end faces 422, 424 of the first subpart 412 and the second subpart 414 face and engage one another in the illustrative component 410. The biscuit 416 is spaced apart from an outer surface 425 of the component 410.

Figure 10:
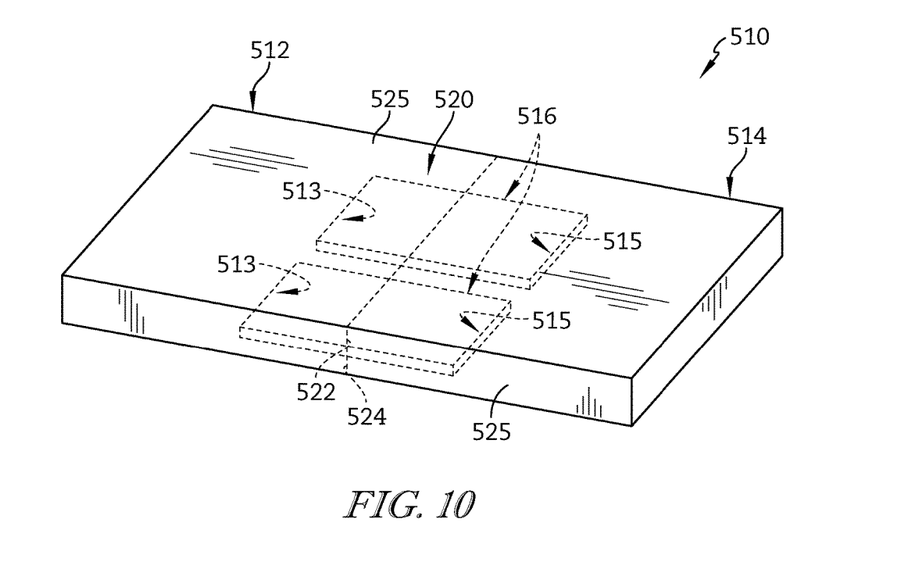
FIG. 10 is a perspective view of a fifth integrally-joined ceramic matrix composite component adapted to be made by one of the methods shown in FIGS. 3-6 showing that the component includes a first ceramic matrix composite subpart, a second ceramic matrix composite subpart, and a pair of rectangular biscuits.

A fifth integrally joined component 510 adapted for use in a gas turbine engine that may be made by method 1000 or 2000 is shown in FIG. 10. The component 510 illustratively comprises ceramic matrix composite materials and is made up of a first subpart 514, a second subpart 514, and a pair of biscuits 516. The biscuits 516 extend into blind slots 513 formed in the first subpart 512 and into blind slots 515 formed in the second subpart 514 to form a joint 520. The joint 520 is coinfiltrated with ceramic-containing matrix material to integrally join the first subpart 512, the second subpart 514, and the biscuits 516.

The first subpart 512, the second subpart 514, and the biscuits 516 are each made up of stacked sheets or plies of reinforcement material that are suspended in a ceramic matrix. In the illustrative embodiment, fibers of the stacked plies comprise silicon-carbide but may comprise other ceramic-containing materials or other non-ceramic materials. In other embodiments, one or more of the first subpart 512, the second subpart 514, and the biscuits 516 may comprise other configurations of reinforcement fibers suspended in a matrix, monolithic ceramic-containing materials, or other materials adapted for use in a gas turbine engine.

In the illustrative embodiment, the biscuits 516 are rectangular components as shown in FIG. 10. The blind slots 513, 515 are shaped to receive substantially all of the biscuits 516 so that end faces 522, 524 of the first subpart 512 and the second subpart 514 face and engage one another in the illustrative component 510. The biscuits 516 are spaced apart from an outer surface 525 of the component 510.

Figure 11:
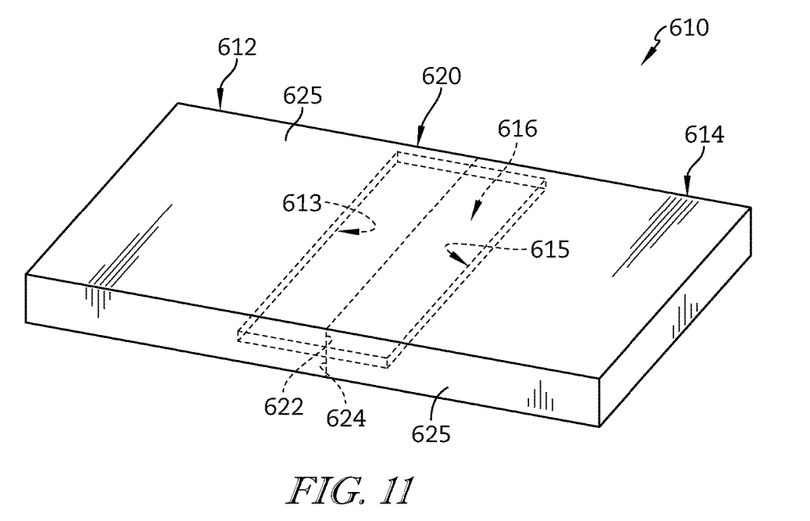
FIG. 11 is a perspective view of a sixth integrally-joined ceramic matrix composite component adapted to be made by one of the methods shown in FIGS. 3-6 showing that the component includes a first ceramic matrix composite subpart, a second ceramic matrix composite subpart, and a single rectangular biscuit.

A sixth integrally joined component 610 adapted for use in a gas turbine engine that may be made by method 1000 or 2000 is shown in FIG. 11. The component 610 illustratively comprises ceramic matrix composite materials and is made up of a first subpart 614, a second subpart 614, and a biscuit 616. The biscuit 616 extends into a slot 613 formed in the first subpart 612 and into a slot 615 formed in the second subpart 614 to form a joint 620. The joint 620 is coinfiltrated with ceramic-containing matrix material to integrally join the first subpart 612, the second subpart 614, and the biscuit 616.

The first subpart 612, the second subpart 614, and the biscuit 616 are each made up of stacked sheets or plies of reinforcement material that are suspended in a ceramic matrix. In the illustrative embodiment, fibers of the stacked plies comprise silicon-carbide but may comprise other ceramic-containing materials or other non-ceramic materials. In other embodiments, one or more of the first subpart 612, the second subpart 614, and the biscuit 616 may comprise other configurations of reinforcement fibers suspended in a matrix, monolithic ceramic-containing materials, or other materials adapted for use in a gas turbine engine.

In the illustrative embodiment, the biscuit 616 is a rectangular component as shown in FIG. 16. The slots 613, 615 are shaped to receive substantially all of the biscuits 616 so that end faces 622, 624 of the first subpart 612 and the second subpart 614 face and engage one another in the illustrative component 610. The biscuit 616 illustratively forms a portion of an outer surface 625 of the component 610.

Figure 12:
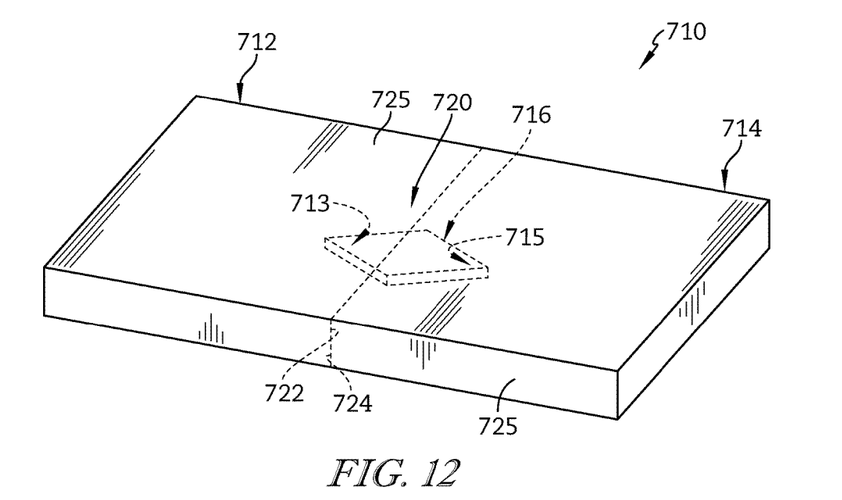
FIG. 12 is a perspective view of a seventh integrally-joined ceramic matrix composite component adapted to be made by one of the methods shown in FIGS. 3-6 showing that the component includes a first ceramic matrix composite subpart, a second ceramic matrix composite subpart, and a single diamond-shaped biscuit.

A seventh integrally joined component 710 adapted for use in a gas turbine engine that may be made by method 1000 or 2000 is shown in FIG. 12. The component 710 illustratively comprises ceramic matrix composite materials and is made up of a first subpart 714, a second subpart 714, and a biscuit 716. The biscuit 716 extends into a blind slot 713 formed in the first subpart 712 and into a blind slot 715 formed in the second subpart 714 to form a joint 720. The joint 720 is coinfiltrated with ceramic-containing matrix material to integrally join the first subpart 712, the second subpart 714, and the biscuit 716.

The first subpart 712, the second subpart 714, and the biscuits 716 are each made up of stacked sheets or plies of reinforcement material that are suspended in a ceramic matrix. In the illustrative embodiment, fibers of the stacked plies comprise silicon-carbide but may comprise other ceramic-containing materials or other non-ceramic materials. In other embodiments, one or more of the first subpart 712, the second subpart 714, and the biscuit 716 may comprise other configurations of reinforcement fibers suspended in a matrix, monolithic ceramic-containing materials, or other materials adapted for use in a gas turbine engine.

In the illustrative embodiment, the biscuit 716 is a diamond shaped component as shown in FIG. 12. The blind slots 713, 715 are shaped to receive substantially all of the biscuit 716 so that end faces 722, 724 of the first subpart 712 and the second subpart 714 face and engage one another in the illustrative component 710. The biscuit 716 is spaced apart from an outer surface 725 of the component 710.

According to the present disclosure, two or more silicon-carbide (SiC) fiber preforms with protective CVI can be joined with a third preform, or "biscuit", using the same slurry infiltration and subsequent melt infiltration as a single component. This may provide robust, simple, individual components that can be joined to make more robust complex components.

The general process flows shown in FIGS. 3-6 of how the presently disclosed methods work provide two different paths with the first forming the general joint geometry in fiber layup and the other forming the general joint geometry with a machining process after CVI. Both form a joined component after the parts have been infiltrated with slurry and subsequently infiltrated with a molten medium (usually Si metal alloy).

Another aspect of the integral joining method taught in this disclosure is that a simple butt joint can be avoided to provide mechanical robustness. Illustratively, in the disclosed embodiments a third piece, or "biscuit", of different geometries is placed interlaminarly into two other components before slurry and melt infiltration is used to consolidate the part. A separate, or third, piece provides a joint that does not extend completely through a thickness of the resulting part and may give better interlaminar mechanical capability.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A method of making an integrated ceramic matrix composite component for use in a gas turbine engine, the method comprising the steps of manufacturing a first green body subpart formed to include a first slot, manufacturing a second green body subpart formed to include a second slot, inserting a green body biscuit into the first slot of the first green body subpart and the second slot of the second green body subpart to create a green assembly with a joint between the first green body subpart and the second green body subpart, and slurry infiltrating the green assembly with ceramic-containing matrix to integrally join the green assembly and produce an integrated ceramic matrix composite component.

2. The method of claim 1, further comprising vapor infiltrating the first green body subpart, the second green body subpart, and the green body biscuit with ceramic-containing matrix to at least partially rigidify the first green body subpart, the second green body subpart, and the green body biscuit.

3. The method of claim 2, wherein the step of vapor infiltrating is performed before the step of inserting the green body biscuit into the first slot of the first green body subpart and the second slot of the second green body subpart to create a green assembly.

4. The method of claim 1, wherein manufacturing the first green body subpart includes laying up a plurality of reinforcement sheets.

5. The method of claim 4, further comprising chemical vapor infiltrating the first green body subpart with ceramic-containing matrix to at least partially rigidify the first green body subpart after laying up the plurality of reinforcement sheets.

6. The method of claim 5, wherein at least some of the plurality of reinforcement sheets are formed to include cutouts that cooperate to define the first slot before the step of vapor infiltrating the first green body subpart with ceramic-containing matrix.

7. The method of claim 5, further comprising machining at least some of the plurality of reinforcement sheets to define the first slot after the step of chemical vapor infiltrating the first green body subpart with ceramic-containing matrix.

8. The method of claim 4, wherein each of the plurality of reinforcement sheets included in the first green body subpart comprises a ceramic-containing fiber.

9. The method of claim 8, wherein the ceramic-containing fiber comprises silicon-carbide and the ceramic-containing matrix comprises silicon-carbide.

10. The method of claim 1, further comprising melt infiltrating the first green body subpart, the second green body subpart, and the green body biscuit with ceramic-containing matrix to integrally join the green assembly.

11. The method of claim 10, wherein the step of melt infiltrating is performed after the step of slurry infiltrating the green assembly with ceramic-containing matrix.

12. A method of making an integrated ceramic matrix composite component for use in a gas turbine engine, the method comprising the steps of chemical vapor infiltrating a first green body subpart, a second green body subpart, and a green body biscuit to at least partially rigidify the first green body subpart, the second green body subpart, and the green body biscuit, inserting the green body biscuit into a first slot formed in the first green body subpart and a second slot formed in the second green body subpart, and slurry infiltrating the first green body subpart, the second green body subpart, and the green body biscuit to produce an integrated ceramic matrix composite component.

13. The method of claim 12, wherein the step of slurry infiltrating the first green body subpart, the second green body subpart, and the green body biscuit is performed after inserting the green body biscuit into the first slot formed in the first green body subpart and the second slot formed in the second green body subpart.

14. The method of claim 13, wherein the step of chemical vapor infiltrating is performed before the step of inserting the green body biscuit into the first slot of the first green body subpart and the second slot of the second green body subpart.

15. The method of claim 12, wherein the first green body subpart includes a plurality of reinforcement sheets adapted to be suspended in ceramic-containing matrix.

16. The method of claim 15, wherein at least some of the plurality of reinforcement sheets are formed to include cutouts that cooperate to define the first slot before the step of vapor infiltrating the first green body subpart with ceramic-containing matrix.

17. The method of claim 15, further comprising machining at least some of the plurality of reinforcement sheets to define the first slot after the step of chemically infiltrating the first green body subpart with ceramic-containing matrix.

18. The method of claim 15, wherein each of the plurality of reinforcement sheets included in the first green body subpart comprises a ceramic-containing fiber.

19. The method of claim 12, further comprising melt infiltrating the first green body subpart, the second green body subpart, and the green body biscuit with ceramic-containing matrix.

* * * * *